(12) United States Patent
Sato et al.

(10) Patent No.: US 7,608,979 B2
(45) Date of Patent: Oct. 27, 2009

(54) DRIVING DEVICE AND DRIVING SYSTEM

(75) Inventors: Junji Sato, Toyokawa (JP); Junichi Tanii, Izumi (JP); Yoshihiro Hara, Takatsuki (JP); Akira Kosaka, Yao (JP)

(73) Assignee: Konica Minolta Holdings, Inc., Tokyo (JP)

( * ) Notice: Subject to any disclaimer, the term of this patent is extended or adjusted under 35 U.S.C. 154(b) by 447 days.

(21) Appl. No.: 11/493,227

(22) Filed: Jul. 26, 2006

(65) Prior Publication Data
US 2007/0030318 A1 Feb. 8, 2007

(30) Foreign Application Priority Data

Aug. 4, 2005 (JP) ............................. 2005-226156
Aug. 4, 2005 (JP) ............................. 2005-226157

(51) Int. Cl.
*H01L 41/08* (2006.01)
(52) U.S. Cl. ............... 310/317; 310/316.02; 310/323.02
(58) Field of Classification Search ............ 310/316.02, 310/317, 323.02
See application file for complete search history.

(56) References Cited

U.S. PATENT DOCUMENTS 6,803,699 B2* 10/2004 Yuasa et al. ................. 310/317
7,190,104 B2* 3/2007 Yuasa ......................... 310/317
7,271,522 B2* 9/2007 Yuasa et al. ................. 310/317

FOREIGN PATENT DOCUMENTS

JP 2004-80964 A 3/2004

* cited by examiner

*Primary Examiner*—Mark Budd
(74) *Attorney, Agent, or Firm*—Sidley Austin LLP

(57) ABSTRACT

Drive technology is provided which makes suitable low velocity driving and smooth changing of driving velocity possible and achieves reduced power consumption. In the driving device, the drive unit is driven which engages with drive shaft which moves back and forth in tandem with extension and contraction of the piezoelectric element. In this driving device, when the output cycle for cycle Te is repeated such that the voltages applied to the piezoelectric element 11 are the maximum value (+Vp), the minimum value (−Vp), and the middle value (0V), the movement velocity of the drive unit 13 can be changed by thinning the output cycle at cycle Tf. As a result, suitable low velocity driving can be carried out and power consumption can be reduced in the drive unit.

21 Claims, 14 Drawing Sheets

FIG. 2
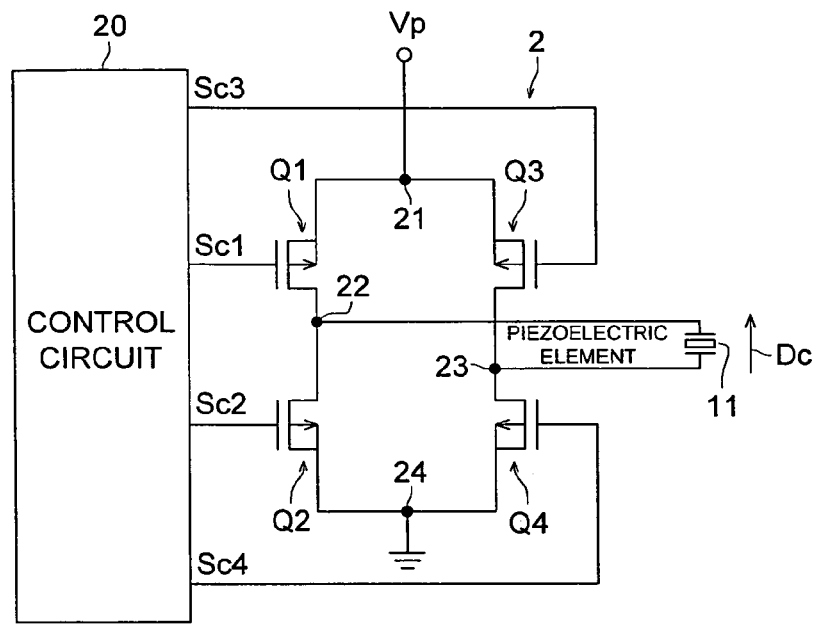
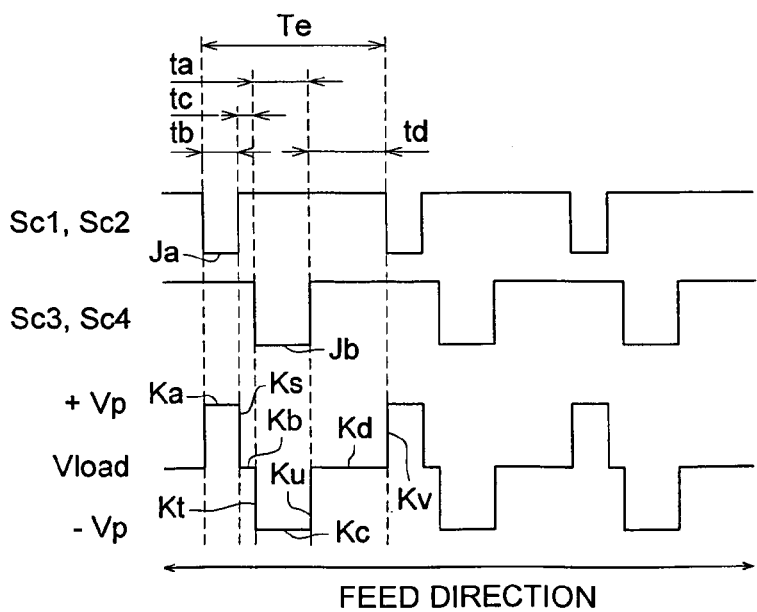

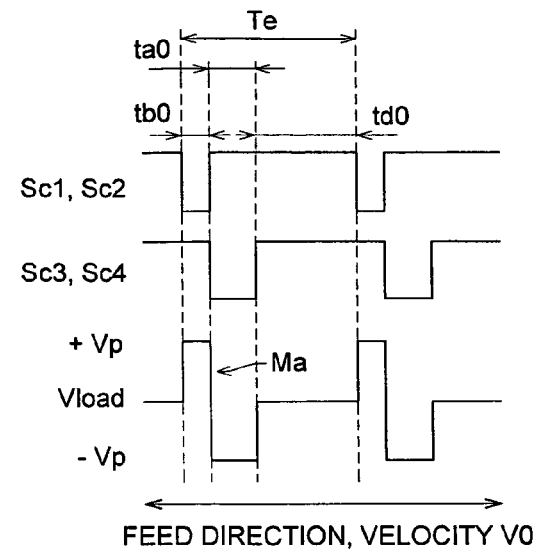
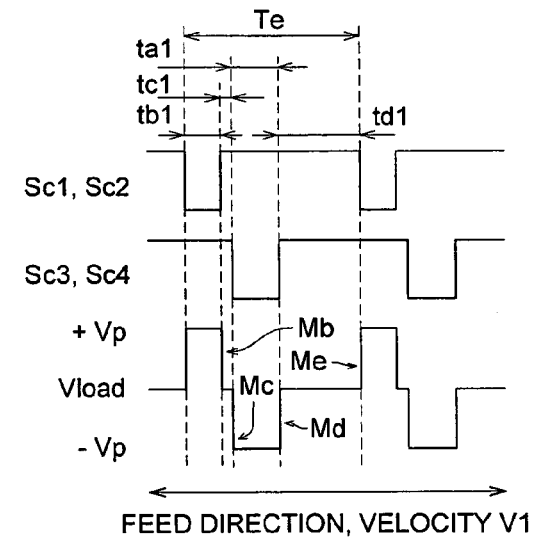
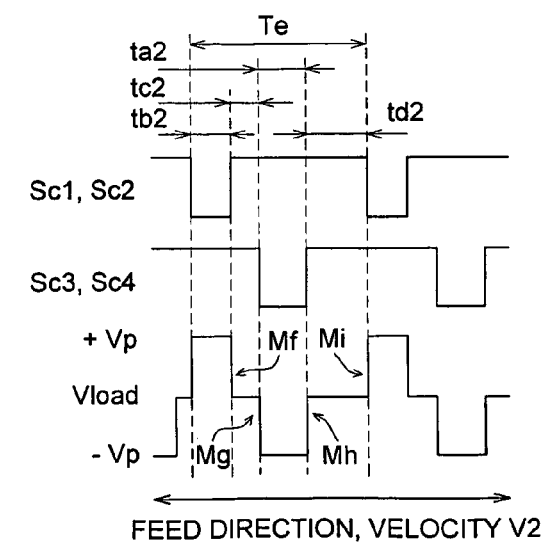

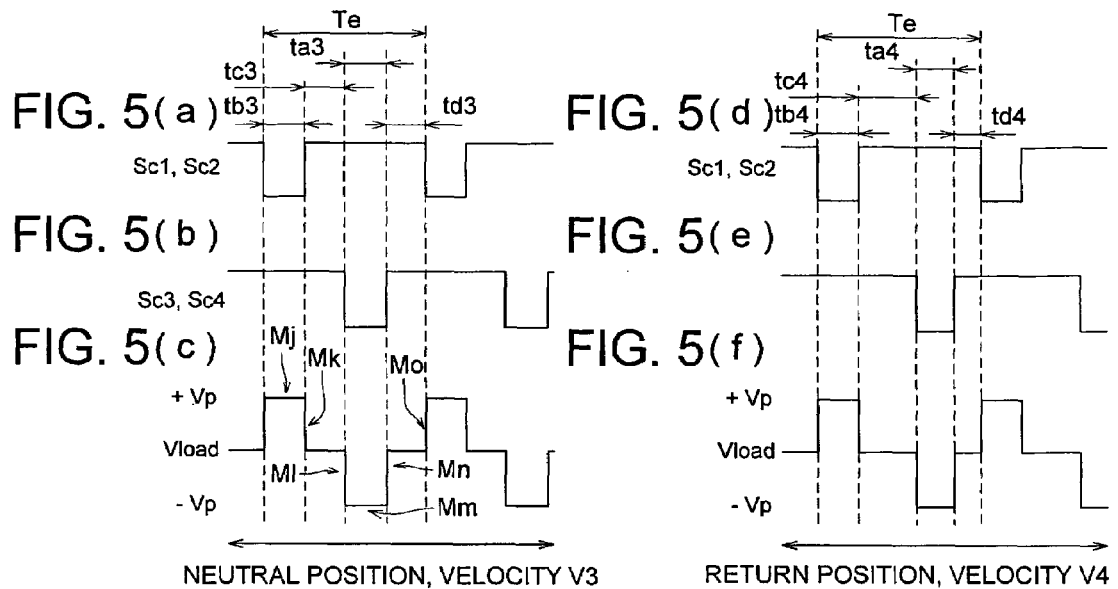
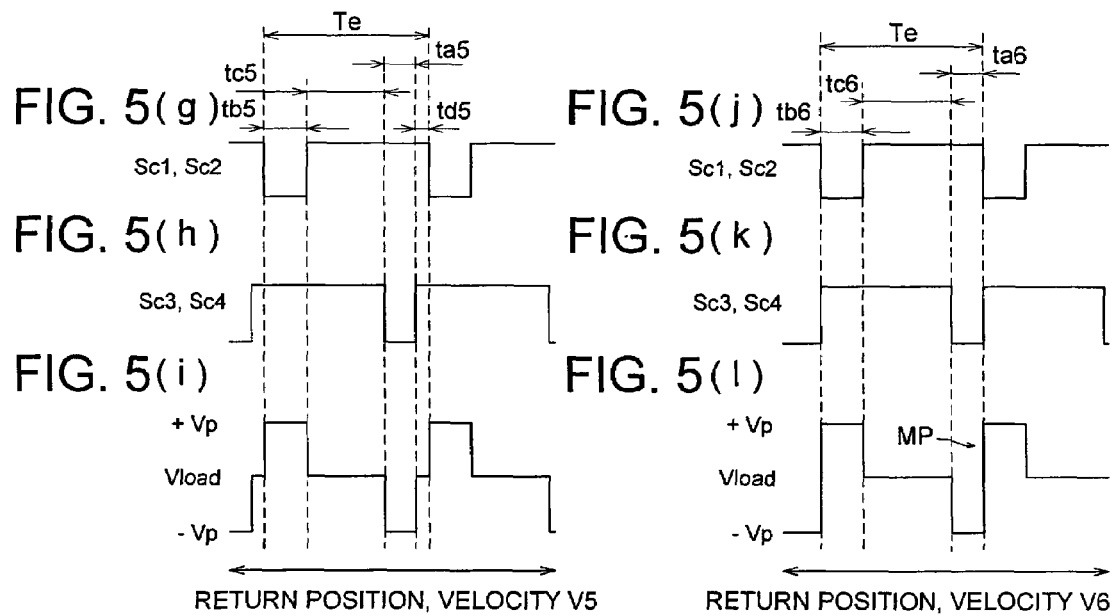

| THINNING RATIO | CURRENT CONSUMPTION[mA] |
|---|---|
| NO THINNING | 122 |
| 1/4 THINNING | 89.2 |
| 2/4 THINNING | 61.6 |
| 3/4 THINNING | 33.8 |

← RETURN DIRECTION    FEED DIRECTION →

DRIVING DEVICE AND DRIVING SYSTEM

This application is based on Japanese Patent Application No. 2005-226156 filed on Aug. 4, 2005, and No. filed on Aug. 4, 2005, in Japanese Patent Office, the entire content of which is hereby incorporated by reference.

TECHNICAL FIELD

This invention relates to a driving device which has an electromechanical conversion element which expands and contracts in response to voltage applied and to a driving system.

BACKGROUND

Various types of driving devices which use an electromechanical conversion element such as a piezoelectric element have been proposed.

For example in the fixed element type of a driving device that is schematically shown in FIG. 14(a) to FIG. 14(c), one end in the extension and contraction direction of the piezoelectric element 92 which is the electromechanical conversion element is fixed to the fixing member 91 and the drive friction member 94 is fixed to the other end. The drive friction member 94 moves in the feed direction and the return direction based on the extension and contraction of the piezoelectric element 92. The moving member 93 engages with the drive friction member 94 due to frictional force.

By applying voltage to the piezoelectric element 92 and causing the velocity of the piezoelectric element 92 to be different at the time of extension and the time of contraction, the moving body 93 is driven. FIG. 14(a) to FIG. 14(c) show the states at Pa, Pb and Pc when voltage is applied in the operation waveform shown in FIG. 15.

In the section Pa-Pb in FIG. 15, when the voltage waveform rises gently, the piezoelectric element 92 expands relatively slowly and changes from the state in FIG. 14(a) to the state in FIG. 14(b). At this time, there is little or no sliding of the moving body 93 against the drive friction member 94, and the moving body 93 is moved substantially integrally with the drive friction member 94.

Next in the section Pb-Pc, when the voltage waveform descends rapidly, the piezoelectric element 92 contracts relatively quickly and the drive friction member 94 rapidly returns to the start position. At this time, sliding occurs between the drive friction member 94 and the moving body 93, and the moving body 93 remains substantially stationary and only the drive friction member 94 returns to the start position. As a result, as shown in FIG. 14(c), the moving body 93 moves in the feed direction from the start position in FIG. 14(a).

The moving body 93 moves along the drive friction member 94 due to this cycle being repeated.

It is to be noted that if the voltage with a return waveform which comprises a steep rise and a gentle fall is applied to the piezoelectric element, the moving body 93 moves in the return direction.

The methods for applying the voltage of the sawtooth waveform to the piezoelectric element 92 include the following two methods.

FIG. 16 shows the first method. As shown in FIG. 16(a), the 8-bit, 0-5V sawtooth waveform for example, is generated by the waveform generator 95 which is a digital analog converter, and this is input into the power amplifier 96, and the sawtooth waveform for driving that has been amplified to 0-10V for example is applied to the piezoelectric element Pv. The sawtooth waveform used for the feed waveform shown in FIG. 16(b) and the return waveform shown in FIG. 16(c) can be generated by adjusting the waveform generator 95.

FIG. 17 and FIG. 18 show the second method. As shown in FIG. 17, a circuit comprising constant current circuits 98a and 98b, and switch circuits 99a and 99b are used in order to apply the voltage of the power source 97 to the piezoelectric element Pv, and the feed waveform and the return waveform are generated by alternately operating the constant current circuits 98a and 98b and switch circuits 99a and 99b.

More specifically, the feed waveform and the return waveform are generated by forming the digital circuit shown in FIG. 18(a) for example and inputting control signals such as those shown in FIG. 18(b) into terminals Ra-Rd.

That is to say, Hi signal is input to the terminal Ra, and after the voltage which applied to the piezoelectric element Pv via the constant current circuit 98a is gradually increased, Hi signal is input to the terminal Rb, and the piezoelectric element Pv is grounded via the switch circuit 99b, and the voltage that is applied to the piezoelectric element Pv is rapidly reduced, and the feed waveform Ha is generated.

In addition, Hi signal is input to the terminal Rc, and after the voltage from the power source 97 is applied to the piezoelectric element Pv via the switch current circuit 99a, Hi signal is input to the terminal Rd, and is grounded via the constant circuit 98b and the return waveform Hb is thereby formed.

However, because in the first method, the waveform generator 95 and the power amplifier 96 are needed, and in the second method the constant current circuits 98a and 98b and switch circuits 99a and 99b are needed, the circuits are complex and the cost is high.

As a result, a driving device having a simple circuit structure has been proposed (See Patent Document 1). In this driving device, drive control is performed using three voltage values (maximum value, minimum value, and middle value) as the voltages that are applied to the piezoelectric element.

[Patent Document 1] Japanese Patent Application Laid-Open No. 2004-80964

In the driving device of the Patent Document 1, low velocity driving is possible to a certain extent using the maximum value, the minimum value and the middle value, but lower velocity driving required for performing servo-control and the like is difficult. In addition, the operation of smoothly changing the drive velocity from the feed direction (front direction) to the return direction (opposite direction) is difficult. Furthermore, no consideration has been given to reducing power consumption at the time of low velocity driving.

SUMMARY

This invention was conceived in view of the above problems, and an object of the present invention thereof is to provide drive technology which achieves suitable slow velocity driving and in which power consumption is reduced.

In view of forgoing, one embodiment according to one aspect of the present invention is a driving device, comprising:

an electromechanical conversion element which expands and contracts in response to an application of voltage;

a predetermined member which reciprocates with the movement of expanding and contracting of the electromechanical conversion element;

a moving member which engages with the predetermined member with frictional force and moves relatively to the predetermined member by the movement of expanding and contracting of the electromechanical conversion element; and a voltage applying section which applies a voltage to the electromechanical conversion element repeating an output cycle in which the voltage applying section outputs selectively one voltage out of a first voltage, a second voltage lower than the first voltage and a third voltage lower than the second voltage, wherein the voltage applying section comprises a velocity change section which changes moving velocity of the moving member by periodically thinning out the output cycle with respect to the repeating of the output cycle.

According to another aspect of the present invention, another embodiment is a driving device, comprising:

an electromechanical conversion element which expands and contracts in response to an application of voltage;

a predetermined member which reciprocates with the movement of expanding and contracting of the electromechanical conversion element;

a moving member which engages with the predetermined member with frictional force and moves relatively to the predetermined member by the movement of expanding and contracting of the electromechanical conversion element; and a voltage applying section which applies a voltage to the electromechanical conversion element repeating an output cycle in which the voltage applying section outputs selectively one voltage out of a first voltage, a second voltage lower than the first voltage and a third voltage lower than the second voltage, the output cycle including a cycle in which the voltage applying section first outputs the first voltage for a first period, outputs the second voltage for the following second period, outputs the third voltage for the following third period and outputs the second voltage for the last fourth period, wherein the voltage applying section includes a velocity control section which control the velocity of the moving member to the predetermined member by varying a length of at least one of the first period and the fourth period, and the velocity control section shortens the third period and the fourth period and expands the first period when expanding the second period, and expands the third and forth period and shortens the first period when shortening the second period.

According to another aspect of the present invention, another embodiment is a driving device, comprising:

an electromechanical conversion element which expands and contracts in response to an application of voltage;

a predetermined member which reciprocates with the movement of expanding and contracting of the electromechanical conversion element;

a moving member which engages with the predetermined member with frictional force and moves relatively to the predetermined member by the movement of expanding and contracting of the electromechanical conversion element; and a voltage applying section which applies a voltage to the electromechanical conversion element repeating an output cycle in which the voltage applying section outputs selectively one voltage out of a first voltage, a second voltage lower than the first voltage and a third voltage lower than the second voltage, the output cycle including a cycle in which the voltage applying section first outputs the first voltage for a first period, outputs the second voltage for the following second period, outputs the third voltage for the following third period and outputs the second voltage for the last fourth period, wherein the voltage applying section comprises a velocity change section which changes moving velocity of the moving member by periodically thinning out the output cycle with respect to the repeating of the output cycle, and a velocity control section which controls the velocity of the moving member to the predetermined member by varying a length of at least one of the first period and the fourth period, the velocity control section shortening the third period and the fourth period and expanding the first period when expanding the second period, and expanding the third period and forth period and shortening the first period when shortening the second period.

BRIEF DESCRIPTION OF THE DRAWINGS

FIG. 2 shows the circuit components of the drive circuit 2.

FIG. 3(a) to FIG. 3(c) are drawings for explaining the operation of the control circuit 20.

FIG. 4(a) to FIG. 4(i) are drawings for explaining velocity control by time width adjustment of the drive waveform.

FIG. 5(a) to FIG. 5(l) are drawings for explaining velocity control by time width adjustment of the drive waveform.

DETAILED DESCRIPTION OF THE PREFERRED EMBODIMENT

Structure of the Driving Device

Figure 1A:
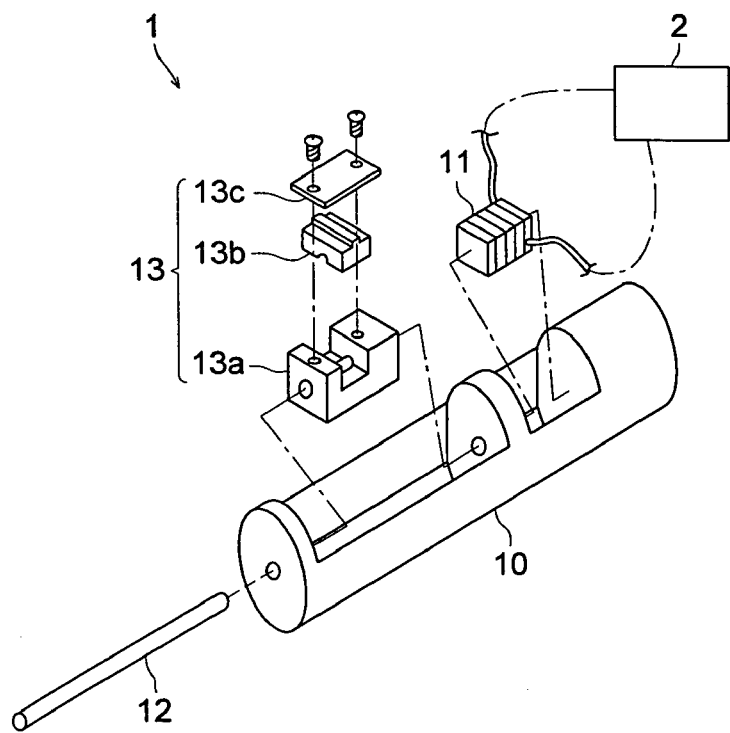
FIG. 1(a) and FIG. 1(b) shows the main components of the driving device of an embodiment of this invention.
Figure 1B:
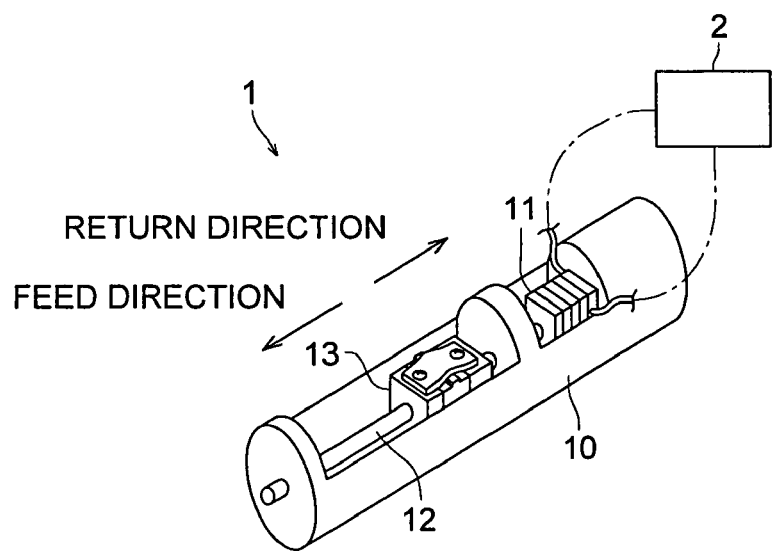

FIG. 1(a) and FIG. 1(b) show the main components of the driving device 1 according to an embodiment of this invention. FIG. 1(a) is an exploded perspective view of the driving device 1 and FIG. 1(b) is an assembled perspective view of the driving device 1.

The driving device 1 comprises a fixing member 10 which can be mounted to the base (not shown) of an XY drive table for example; a stacked piezoelectric element 11 for example; a drive shaft 12 which is supported so as to be slidable on the fixing member 10; and a drive unit 13 which couples with stage (not shown) of the XY drive table.

One end surface in the extension and contraction direction of the piezoelectric element 11 is fixed and coupled to the fixing member 10 and one axle end surface of the drive shaft 12 which functions as the drive friction member (predetermined member) is fixed and coupled to the other end surface in the extension and contraction direction.

The drive unit (moving member) 13 which comprises a slider 13a, a drive member 13b and a plate spring 13c engages with the drive shaft 12 due to frictional force.

In the driving device 1, the drive shaft 12 is moved back and forth in tandem with the extension and contraction movement of the piezoelectric element 11 which expands and contracts in accordance with application of voltage by the drive circuit 2, and relative movement of the drive unit 13 with respect to the drive shaft 12 is thereby made possible.

FIG. 2 shows the circuit components of the drive circuit 2.

The drive circuit 2 comprises a control circuit 20 and 4 switch elements Q1-Q4 and voltage is applied between the terminals of the piezoelectric element 11.

The switch elements Q1-Q4 are formed as MOS type FET and each gate is connected to the terminals Sc1-Sc4 of the control circuit 20 and Hi signals or Lo signals are input.

The switch elements Q1 and Q3 are formed as P-channel FET and when Lo signals are input to the gate, the area between the source and the drain comes ON (conductive state), and if Hi signals are input to the gate, the area between the source and the gate is OFF (cut-off state). In addition, the switch elements Q2 and Q4 are formed as the N-channel FET and when Hi signals are input to the gate, the area between the source and the drain comes ON (conductive state), and if Lo signals are input, the area between the source and the gate is OFF (cut-off state).

The source of the switch element Q1 and the source of the switch element Q3 are each connected to the power source voltage Vp via the connection point 21. In addition, the drain of the switch element Q1 is connected to the drain of the switch element Q2 via the connection point 22, and the drain of the switch element Q3 is connected to the drain of the switch element Q4 via the connection point 23. Furthermore, the source of the switch element Q2 and the source of the switch element Q4 are respectively grounded via connection points 24. Furthermore, each terminal of the piezoelectric element 11 is connected to the connection points 22 and 23 respectively.

Operation of the Driving Device 1

The operation of the driving device 1 having the configuration described above will be described in the following. The description of velocity control will be done in the following order: (i) Velocity control by time width adjustment at the drive waveform, (ii) Velocity control by drive signal thinning, and (iii) Velocity control by a combination of both.

(i) Velocity control by time width adjustment at the drive waveform

First the driving principle for time width adjustment at the drive waveform will be described with reference to FIG. 3(a) to Fig. (c). FIG. 3(a) shows the voltage of the terminal Sc1 and the terminal Sc2 of the control circuit 20 (or in other words the gate voltage for the switch element Q1 and the switch element Q2). FIG. 3(b) shows the voltage of the terminal Sc3 and the terminal Sc4 of the control circuit 20 (or in other words the gate voltage for the switch element Q3 and the switch element Q4). FIG. 3(c) shows the drive voltage Vload having the rectangular waveform that is applied between the terminals of the piezoelectric element 11, and in this drive voltage Vload, the direction shown by the arrow Dc in FIG. 2 is the front.

In the driving device 1, the drive unit 13 can drive in the feed direction or the return direction by repetition of the cycle Te which comprises a first period to a fourth period which are described hereinafter, and by changing the length of the first period to fourth period, the movement velocity of the drive unit 13 with respect to the drive shaft 12 can be changed. It is to be noted that the signals shown in FIG. 3(a) to FIG. 3(c) are examples of the case in which the drive unit 13 drives in the feed direction.

In the first period tb, terminal Sc1 and terminal Sc2 become Lo like the signal Ja shown in FIG. 3(a), and terminal Sc3 and next terminal Sc4 are in Hi state. Due to the signal state of this first period tb, the switch element Q1 and the switch element Q4 are in the conductive state which is ON, and the switch element Q2 and the switch element Q3 are in the cut-off state which is OFF. Consequently, because the connection point 23 is grounded via the switch element Q4, and the connection point 22 is connected via the switch element Q1, to the power source voltage Vp, the drive voltage load Vload between both terminals of the piezoelectric element 11 becomes +Vp (maximum value) which is equivalent to the power source voltages like signal Ka shown in FIG. 3(c).

Next in the second period tc, as shown in FIG. 3(a), the terminal Sc1 and the terminal Sc2 become Hi and as shown in FIG. 3(b), the terminal Sc3 and the terminal Sc4 are in the Hi state next. Due to the signal state of the second period tc, in the drive circuit 2, the switch element Q1 and the switch element Q3 are in the cut-off state which is OFF, and the switch element Q2 and the switch element Q4 are in the conductive state which is ON. Consequently, because the connection point 22 is connected via the switch element Q2 and the switch element Q4 to the connection point 23, and there is a short circuit between the terminals of the piezoelectric element 11, the drive voltage Vload between both ends of the piezoelectric element 11 is the 0 volts (middle value 1) like the signal Kb shown in FIG. 7(c).

In the third period ta, as shown in FIG. 3(a), the terminal Sc1 and the terminal Sc2 change to the high state next and the terminal Sc3 and the terminal Sc4 become Lo like the signal Jb shown in FIG. 3(b). Due to the signal state of the third period ta, the switch element Q1 and the switch element Q4 are in the cut-off state which is OFF, and the switch element Q2 and the switch element Q3 are in the conductive state which is ON. Consequently, because the connection point 22 is grounded via the switch element Q2 and the connection point 23 is connected to the power source voltage Vp via the switch element Q3, the drive voltage Vload becomes −Vp (minimum value) like the signal Kc shown in FIG. 7(c).

In the fourth period td which is the last, (td=Te−ta−tb−tc), as shown in FIG. 3(a), the terminal Sc1 and the terminal Sc2 change to the Hi state next, and the terminal Sc3 and the terminal Sc4 become Hi like in FIG. 3(b). Due to the signal state of the fourth period td, the switch element Q1 and the switch element Q3 are in the cut-off state which is OFF, and the switch element Q2 and the switch element Q4 are in the conductive state which is ON. Consequently, because the connection point 22 is connected via the switch element Q2 and the switch element Q4 to the connection point 23, and there is a short circuit between the terminals of the piezoelectric element 11, the drive voltage Vload is the 0 volts (middle value 2) like the signal Kd shown in FIG. 3(c).

In the drive circuit 2 described above, an output cycle is repeated which selectively outputs 1 voltage value from the maximum value (first voltage value) +Vp which corresponds to the power source voltage Vp, the middle value (second voltage value) 0V which is lower than the maximum value, and a minimum value (third voltage value) −Vp which is lower than the middle value, and the voltage is applied to the piezoelectric element 11. As a result, as shown in FIG. 3(a) to FIG. (c), in the cycle period Te of the drive voltage Vload, the drive shaft 12 and the drive unit 13 are sent in the feed direction by the signals Ku and Kv which rise twice at relatively separate timings. On the other hand, in the 1 cycle period Te of the drive voltage Vload, the drive shaft 12 is displaced relatively steeply in the return direction by the signals Ku and Kv which rise twice at relatively close timing. At this time, the drive unit 13 attempts to move in the return direction, but the amount of movement (return amount) is smaller than the amount of movement in the feed direction. By repeating this operation, the drive unit 13 can drive in the feed direction along the drive shaft 12.

Here, the total time of the first period and the third period (ta+tb) is fixed and the total time of the second period and the fourth period (tc+td) is fixed without changing the 1 cycle period Te, while if the second cycle tc is increased, the first cycle tb is also changed so as to increase simultaneously. That is to say, in the case where the second period tc is expanded, the third period ta and the fourth period td are shortened and the first period tb is lengthened, and in the case where the second period tc is shortened, the third period ta and the fourth period td are lengthened and the first period tb is shortened. In addition, in the case where the length of the first period tb and the third period ta are to be the same, the length of the second period tc and the fourth period td are also the same. As a result, continuous change from the drive waveform in the feed direction for the drive unit 13 in both the feed direction and the return direction, via the neutral state in which the drive unit 13 does not move to the drive waveform in the return direction is possible, and thus smooth changing of the drive velocity of the drive unit 13 is possible. The method of velocity control by time width adjustment of the drive waveform will be described in detail.

FIG. 4(*a*) to FIG. 4(*i*) and FIG. 5(*a*) to FIG. 5(*l*) are for explaining velocity control by time width adjustment of the drive waveform, and they show a drive waveform in the case where the velocity and drive direction of the drive unit 12 are gradually changed.

FIG. 4(*a*) to FIG. 4(*c*) show the drive waveform in the case where the second period tc is set to 0 in FIG. 3(*a*) to FIG. (*c*). In this drive waveform, as shown in FIG. 4(*c*), because the fall signal Ma for the drive voltage Vload is the steepest, there is little or no movement of the drive unit 12 in the return position and the current position is maintained. As a result, in this type of case, the movement velocity V0 of the drive unit 13 is maximum in the feed direction.

Next as shown in FIG. 4(*d*) to FIG. 4(*f*), the time interval of the rise signals Md and Me in the drive voltage Vload are shortened, and by expanding the time interval of the fall signals Mb and Mc by the same amount, the send amount in the feed direction is reduced by the fall of the drive voltage Vload and also the send amount in the return direction is increased by the rise of the drive voltage Vload. As a result, the drive velocity of the drive unit 13 can be made slow relative to the velocity in the case of the drive waveform shown in FIG. 5(*c*).

Similarly, as shown in FIG. 4(*g*) to FIG. 4(*i*), the time interval of the rise signals Mh and Mi in the drive voltage Vload are shortened, and by expanding the time interval of the fall signals Mf and Mg, the drive velocity of the drive unit 13 can be reduced in the feed direction.

Furthermore, if the time interval of the rise signals in the drive voltage Vload are shortened and the time interval of the fall signals are expanded, these time intervals become the same (FIG. 5(*a*) to FIG. 5(*c*)). At this time, in order for the period of the signal Mj (first period) tb3 for performing output of +Vp in drive voltage Vload and the period of the signal Mm (third period) ta3 for performing output of −Vp to be the same, the time for the first period tb and the third period ta are smoothly adjusted so that the signal waveform for Sc1 and Sc2 shown in FIG. 5(*a*) and the signal waveforms for Sc3 and Sc4 shown in FIG. 5(*b*) have the same waveform.

As a result, the feed amount of the drive unit 13 due to the rise signals Mn, Mo of the drive voltage Vload and the return amount of the drive unit 13 due to the fall signals Mk, Ml of the drive voltage Vload become equal, the movement velocity V3 of the drive unit 13 is approximately 0 and it transfers to a stationary state.

From this stationary state, the waveform of the drive signal shown in FIG. 5(*d*) to FIG. 5(*f*) and the waveform of the drive signal shown in FIG. 5(*g*) to FIG. 5(*i*) are generated by further shortening the time interval of the rise signals and expanding the time interval of the rise signals in the drive voltage Vload. In the drive unit 13, due to these drive waveforms, unlike the drive state in the feed direction shown in FIG. 4(*a*) to FIG. 4(*i*), because the return amount due to fall signal is greater than the feed amount due to the rise signal, the drive velocity V3 due to the drive waveform of FIG. 5(*d*) to FIG. 5(*f*) and the drive velocity V4 (V4>V3) due to the drive waveform of FIG. 5(*g*) to FIG. 5(*i*) are the velocity for the return direction.

In addition, if the time interval for the rise signal is shortened more and the fourth period td=0, the drive load, the rise signal Mp of the drive voltage Vload will be the steepest and the drive waveform shown in FIG. 5(*j*) to FIG. 5(*l*) is generated. The signal waveform of FIG. 5(*j*) to FIG. 5(*k*) is equivalent to one in which the signal waveform of Sc1 and Sc2 shown in FIG. 4(*a*) is replaced with the signal waveform of Sc3 and Sc4 shown in FIG. 4(*b*). The drive velocity of the drive unit 13 that is driven by this type of drive waveform is the maximum velocity V6 in the return direction which is substantially the same size as the maximum velocity V0 in the feed direction.

As described above, the output time (second period) for the for the middle value 1 and the output time (fourth period) for the middle value 2 in the drive voltage Vload are complementally increased and reduced, while the output time (first period) for the maximum value and the output time (third period) for the minimum value in the drive voltage Vload are complementally increased and reduced, and thus the velocity of the drive unit 13 can be continuously changed from the feed direction to the return direction.

A graph showing the measured value for the drive velocity in the case where the time width of the drive waveform is changed using the velocity control method described above is shown in FIG. 6.

Figure 6:
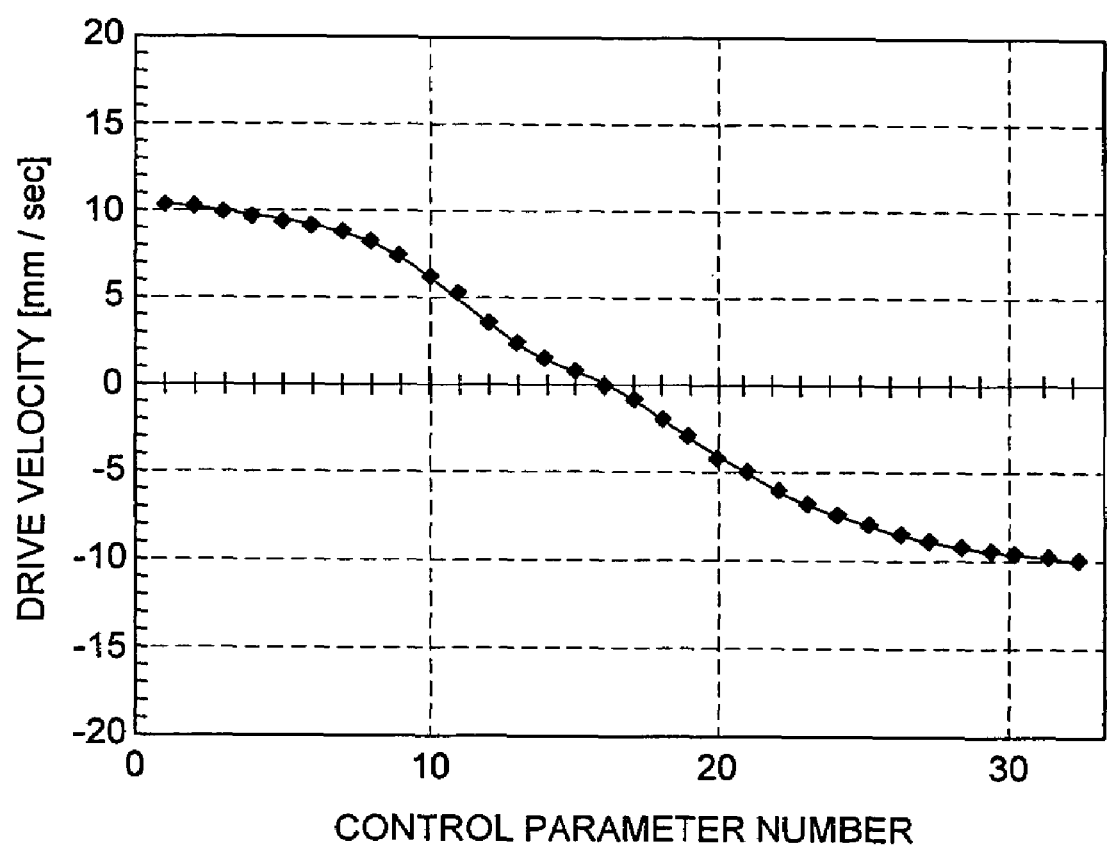
FIG. 6 shows the measured value for drive velocity in the case where velocity control is done by time width adjustment of the drive waveform.

In FIG. 6, the horizontal axis shows the control parameter number and the vertical axis shows the drive velocity of the drive unit 13. The control parameter number refers to the numbers from number "1" which is assigned to control parameter for which the drive velocity is maximum in the feed direction as shown in FIG. 4(*a*) to FIG. 4(*c*) to the number "32" which is assigned to control parameter for which the drive velocity is maximum in the return direction as shown in FIG. 5(*j*) to FIG. 5(*l*), and the numbers that have been assigned to parameters at each point when the time periods (first time to fourth time) which output the maximum value, the middle value 1, the middle value 2, and the minimum value are gradually changed. It is to be noted that the control parameter number "16" corresponds to control of the stationary state of the drive control unit shown in FIG. 5(*a*) to FIG. 5(*c*).

As shown in the graph in FIG. 6, by changing the control parameters for which the time widths for the first period to the fourth period is different, the drive velocity of the drive unit can be changed substantially linearly and continuously from the feed direction to the return direction.

(ii) Velocity Control by Drive Signal Thinning

In the driving device 1, by performing thinning of the drive signals in the control circuit 20, power consumption is reduced and it becomes possible to reduce the driving velocity of the drive unit 13. This will be described in detail below.

FIG. 7(a) to FIG. 7(e) are for explaining the velocity control by thinning of the drive signals.

Figure 7:
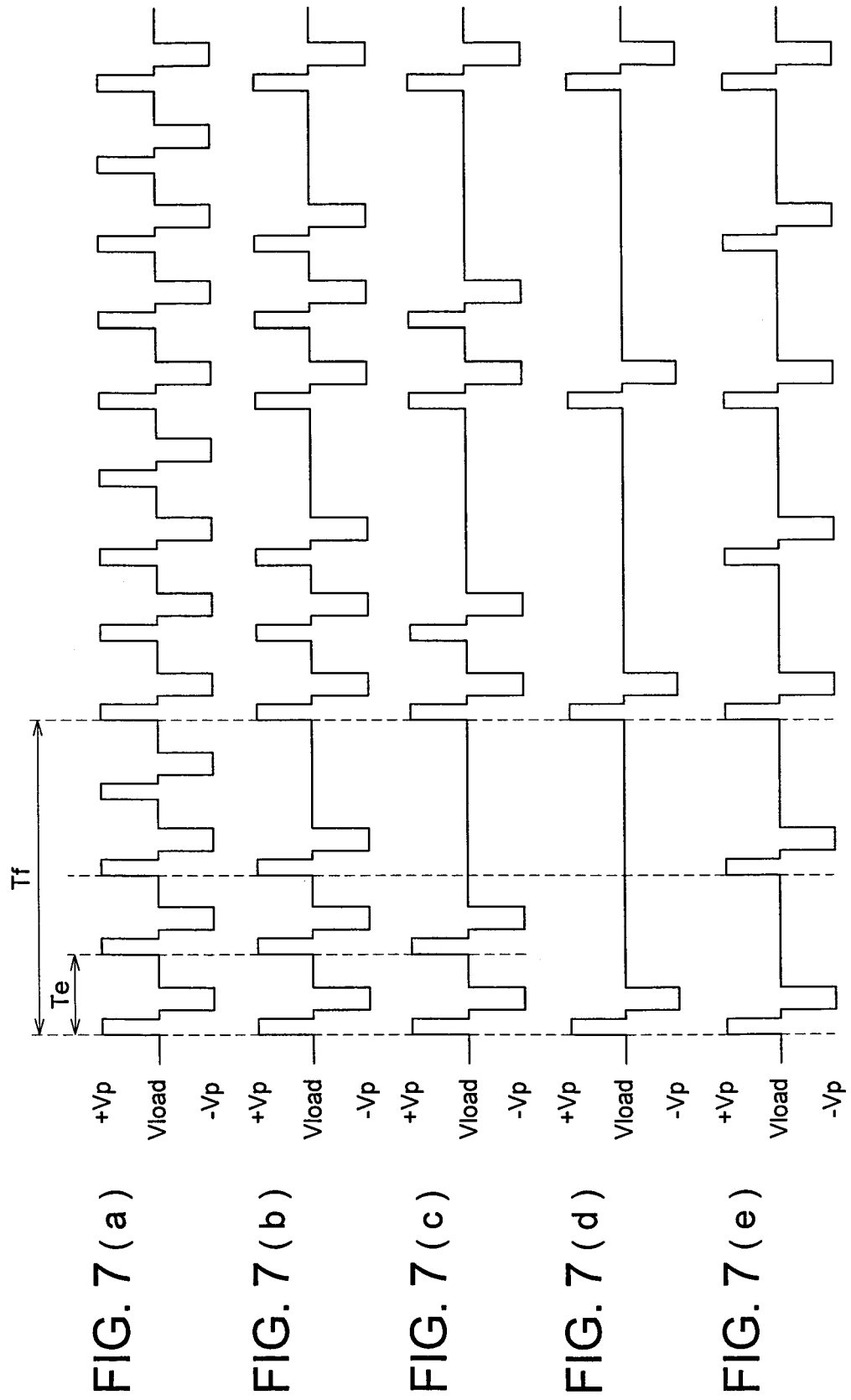
FIG. 7(a) to FIG. 7(e) are drawings for explaining velocity control by drive signal thinning.

The drive signals shown in FIG. 7(a) shows the drive waveform of the cycle Te shown in FIG. 3(c) in frequencies of about 10 or more and is in the state in which thinning has not been performed (no-thinning state).

On the other hand, the drive signal shown in FIG. 7(b) is that in which the voltages +Vp and −Vp that are sequentially applied to the piezoelectric element 11 are thinned once for each cycle (called thinning cycle hereinafter) Tf (=4×Te). The amount of movement of the drive unit 13 between the 1 cycle Te due to the drive signals shown in FIG. 3(c) is determined by the feed amount (send amount) due to the rise signal of the drive waveform and the return amount due to the fall signal. That is to say, in the drive signals shown in FIG. 7(a), because four drive cycles are performed during the thinning cycle Tf, the movement of the drive unit 13 is four times the amount of movement. Meanwhile, for the drive signal shown in FIG. 7(b), after movement for 3 drive cycles are performed in the thinning cycle Tf, there is a 1 cycle period in which driving does not occur and the present position is maintained. For this reason, movement velocity of the drive unit 13 is approximately ¾ of that in the case where there in no thinning as shown in FIG. 7(a).

The drive signal shown in FIG. 7(c) is one in which the drive signal in FIG. 7(b) is thinned further. In this drive signal, because 2 drive cycles are performed in the thinning cycle Tf, the movement velocity of the drive unit 13 is approximately half that in the case where there in no thinning as shown in FIG. 7(a). It is to be noted that in the drive signal in which 2 signal thinning are performed during the thinning cycle Tf, the drive signal is not limited to that shown in FIG. 7(c), and as shown in FIG. 7(e), it may be configured as a drive signal in which 1 signal thinning is performed during the half cycle of the thinning cycle Tf.

In addition, the drive signal shown in FIG. 7(d) is one in which the drive signal in FIG. 7(c) is thinned further. In this drive signal, because 3 drive cycles are performed in the thinning cycle Tf, the movement velocity of the drive unit 13 is approximately ¼ that in the case where there is no thinning as shown in FIG. 7(a).

As described above, by cyclically performing thinning of the output cycle shown in FIG. 7(b) to FIG. 7(e) at the thinning cycle Tf for repeating the output cycle of the cycle Te shown in FIG. 7(a), the movement velocity of the drive unit 13 with respect to the drive shaft 12 can be changed in accordance with the thinning ratio.

In the piezoelectric element 11 which is used as the actuator, because current flows and power is consumed when the applied voltage is changed, by reducing the frequency for changing the voltage applied, power consumption reduction which is substantially proportional to the reduced frequency can be carried out.

As a result, the proportions of current consumption in the case where the drive voltage shown in FIG. 7(a) to FIG. 7(e) is applied to the piezoelectric element are approximately 1:¾:½:¼, and when the drive unit 13 is driven at low velocity, current consumption can be appropriately reduced.

In the case where the drive signal is subjected to thinning, by setting the thinning frequency Ff=1/Tf to 20 kHz or higher which is the upper limit of the audible frequency, generation of disturbing drive sounds is suppressed and low velocity is achieved. That is to say, if thinning is performed cyclically based on a frequency outside of the audible frequency (such as a frequency of 20 kHz or more), even if the thinning timing is different as is the case for the drive signals in FIG. 7(c) and the drive signals in FIG. 7(e), driving is possible without drive sounds being generated.

A graph of the measured values for the drive velocity in the case where velocity control is performed by thinning of the drive signals as described above is shown in FIG. 8.

Figures 8, 9:
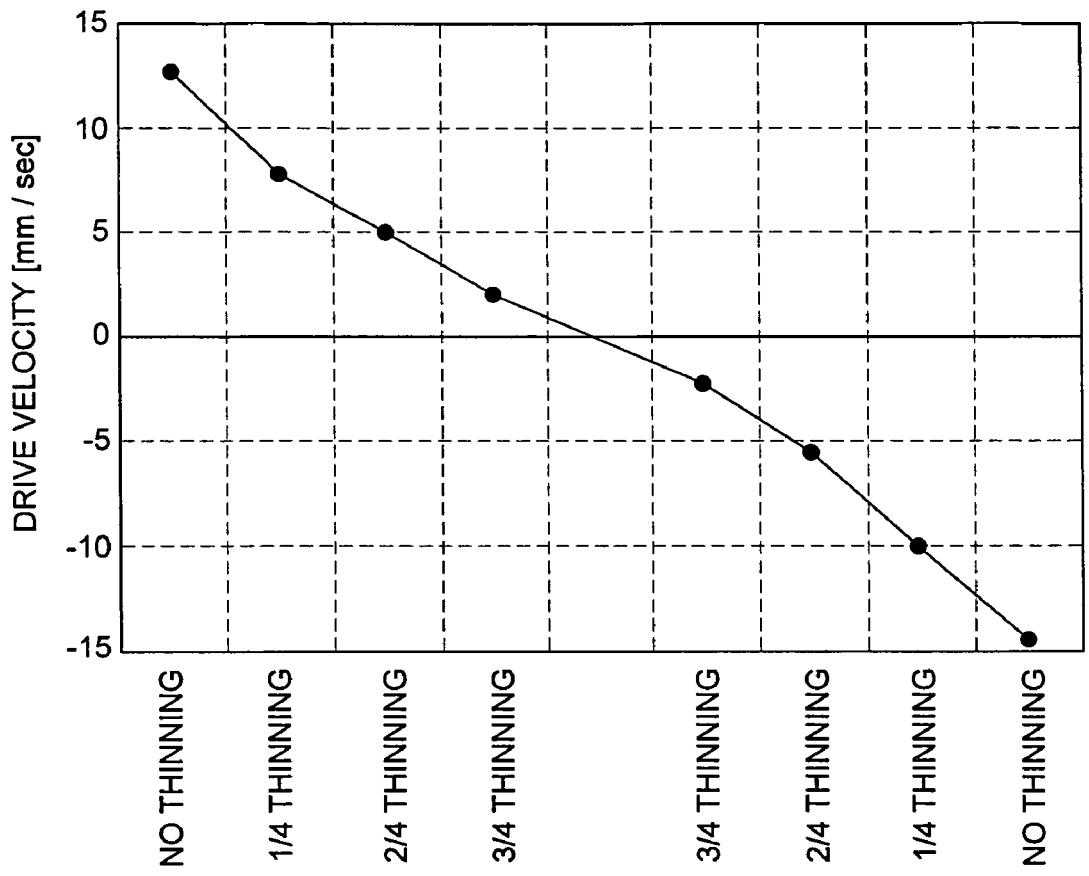
FIG. 8 shows the measured value for drive velocity in the case where velocity control is done by drive signal thinning.
FIG. 9 is for explaining the relationship between the drive signal thinning ratio and the current consumed by the piezoelectric element.

In FIG. 8, the horizontal axis shows the thinning ratio and the vertical axis shows the drive velocity of the drive unit 13. The thinning ratio shows the cases from that of "no thinning" to the case "¾ thinning" by increasing by ¼ at a time for the thinning ratio of the drive signal in FIG. 4(c) where the drive velocity in the feed direction is the maximum and the cases from "¾ thinning" to "no thinning" by reducing by ¼ at a time for the thinning ratio of the drive signal in FIG. 5(l) where the drive velocity in the return direction is the maximum.

As shown in the graph of FIG. 8, in the driving device 1, velocity control of the drive unit 13 in accordance with the thinning ratio in the feed direction or in the return direction is possible. Meanwhile, the current consumption (average current during driving) of the piezoelectric element at each thinning ratio is obtained from the measurement results shown in FIG. 9, but the current value corresponds to the thinning ratio of the drive signals as described above. That is to say, the drive velocity and the current consumption of the drive unit 13 change substantially proportional to the thinning ratio of the drive signals.

(iii) Velocity control using a combination of the velocity control methods of (i) and (ii)

Velocity control in which the velocity control using time width adjustment at the drive waveform described in (i) above is combined with the velocity control using thinning of the drive signals described in (ii) above is called "hybrid control" hereinafter and will be described in the following.

Figure 10:
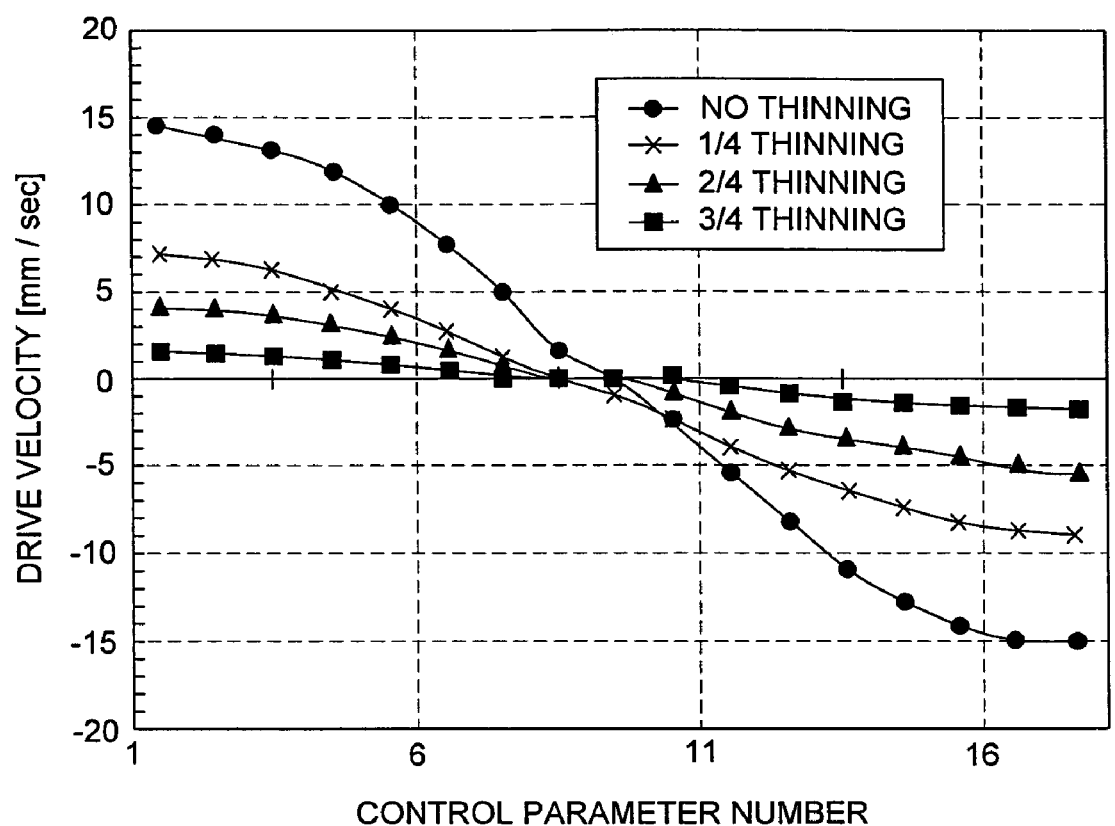
FIG. 10 is a drawing for explaining hybrid control.

FIG. 10 is a drawing for explaining hybrid control. In the control parameter numbers shown in the horizontal axis in FIG. 10, control parameter numbers 1-17 are assigned to each point when the control parameters are changed like the time width control of the drive waveform shown in FIG. 6. In addition, in the drive signal in which the time width is set by the control parameters, the measured values of the drive velocities in the case where the thinning ratio is changed by ¼ at a time from "no thinning" to "¾ thinning" are plotted in FIG. 10.

As shown in the graph of FIG. 10, in the case where velocity control by thinning the drive signals is combined with the case where drive velocity is controlled by adjusting only time width of the drive waveform without thinning (hybrid control), fine control of drive velocity is possible because low velocity driving based on thinning ratio is performed.

An example of velocity control in which this type of hybrid control is used for gradually reducing the drive velocity from the maximum velocity in the feed direction and changing to the maximum velocity in the return direction is described in the following with reference to FIG. 11.

First, the drive waveform shown in FIG. 4(c) is not thinned and the drive unit 13 is driven at the maximum velocity in the feed direction by applying it to the piezoelectric element 13. Next, in the case where the drive velocity of the drive unit 13 is gradually reduced, control is performed in the order (1) to (14) described below.

(1) Due to velocity control by time width adjustment of the drive waveform, a change is made to the drive waveform of FIG. 4(*i*) via the drive waveform in FIG. 4(*f*). As a result, the drive velocity is reduced as shown by the arrow D1 in FIG. 11.

Figure 11:
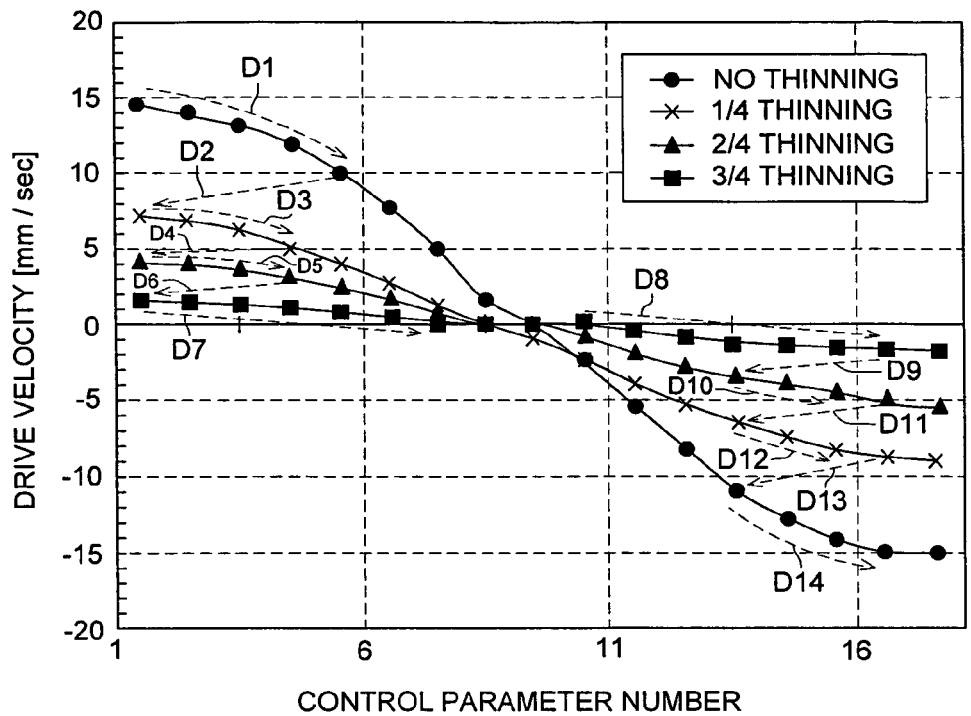
FIG. 11 shows an example of hybrid control.

(2) In the drive waveform shown in FIG. 4(*c*), in the case where the velocity is reduced to the level of the drive velocity for performing ¼ thinning (maximum velocity for quarter thinning), as shown by the arrow D2 in FIG. 11, the drive waveform returns to the drive waveform of the time width shown in FIG. 4(*c*) and ¼ thinning of the drive signal is performed.

(3) Due to velocity control by time width adjustment of the drive waveform with the drive signal remaining in the ¼ thinning state, a change is made to the drive waveform of FIG. 4(*i*) via the drive waveform in FIG. 4(*f*). As a result, the drive velocity is reduced as shown by the arrow D3 in FIG. 11.

(4) In the drive waveform shown in FIG. 4(*c*), in the case where the velocity is reduced to the level of the drive velocity for performing ½ thinning, as shown in the arrow D4 in FIG. 11, the drive waveform returns to the drive waveform of the time width shown in FIG. 4(*c*) and ½ thinning of the drive signal is performed.

(5) Using velocity control by time width adjustment of the drive waveform with the drive signal remaining in the ½ thinning state, a change is made to the drive waveform of FIG. 4(*i*) via the drive waveform in FIG. 4(*f*). As a result, the drive velocity is reduced as shown by the arrow D5 in FIG. 11.

(6) In the drive waveform shown in FIG. 4(*c*), in the case where the velocity is reduced to the level of the drive velocity for performing ¾ thinning, as shown by the arrow D6 in FIG. 11, the drive waveform returns to the drive waveform of the time width shown in FIG. 4(*c*) and ¾ thinning of the drive signal is performed.

(7) Using velocity control by time width adjustment of the drive waveform with the drive signal in the ¾ thinning state, a change is made to the drive waveform of FIG. 5(*c*) via the drive waveform in FIG. 4(*f*) or the drive waveform in FIG. 4(*i*). As a result, the drive velocity is gradually reduced as shown by the arrow D7 in FIG. 11, and the drive unit 13 is transferred to the stationary state.

(8) When the drive unit 13 reaches the stationary state, due to velocity control by time width adjustment of the drive waveform in the return direction with the drive signal remaining in the ¾ thinning state, a change is made from the drive waveform in FIG. 5(*c*) to the drive waveform of FIG. 5(*l*) via the drive waveform in FIG. 5(*f*) or the drive waveform in FIG. 5(*i*). As a result, the drive direction turns to the return direction and the velocity is gradually increased as shown by the arrow D8 in FIG. 11

(9) When time width control is performed until the drive waveform of FIG. 5(*l*) is reached, as shown by the arrow D9 in FIG. 11, the drive waveform returns to the drive waveform of the time width shown in FIG. 5(*f*) and ½ thinning of the drive signal is performed.

(10) Due to velocity control by time width adjustment of the drive waveform with the drive signal remaining in the ½ thinning state, a change is made to the drive waveform of FIG. 5(*l*) via the drive waveform in FIG. 5(*i*). As a result, the drive velocity increases in the return direction as shown by the arrow D10 in FIG. 11.

(11) When time width control is performed until the drive waveform of FIG. 5(*l*) is reached, as shown by the arrow D11 in FIG. 11, the drive waveform returns to the drive waveform of the time width shown in FIG. 5(*f*) and ¼ thinning of the drive signal is performed.

(12) Due to velocity control by time width adjustment of the drive waveform with the drive signal remaining in the ¼ shinning state, a change is made to the drive waveform of FIG. 5(*l*) via the drive waveform in FIG. 5(*i*). As a result, the drive velocity increases in the return direction as shown by the arrow D12 in FIG. 11.

(13) When time width control is performed until the drive waveform of FIG. 5(*l*) is reached, as shown by the arrow D13 in FIG. 11, the drive waveform returns to the drive waveform of the time width shown in FIG. 5(*f*) and no thinning control is performed.

(14) Due to velocity control by time width adjustment of the drive waveform with the drive signal remaining in the no thinning state, a change is made to the drive waveform of FIG. 5(*l*) via the drive waveform in FIG. 5(*i*). As a result, the drive velocity gradually increases and the maximum velocity of the drive unit 13 is reached in the return direction as shown by the arrow D14 in FIG. 11.

Figure 12:
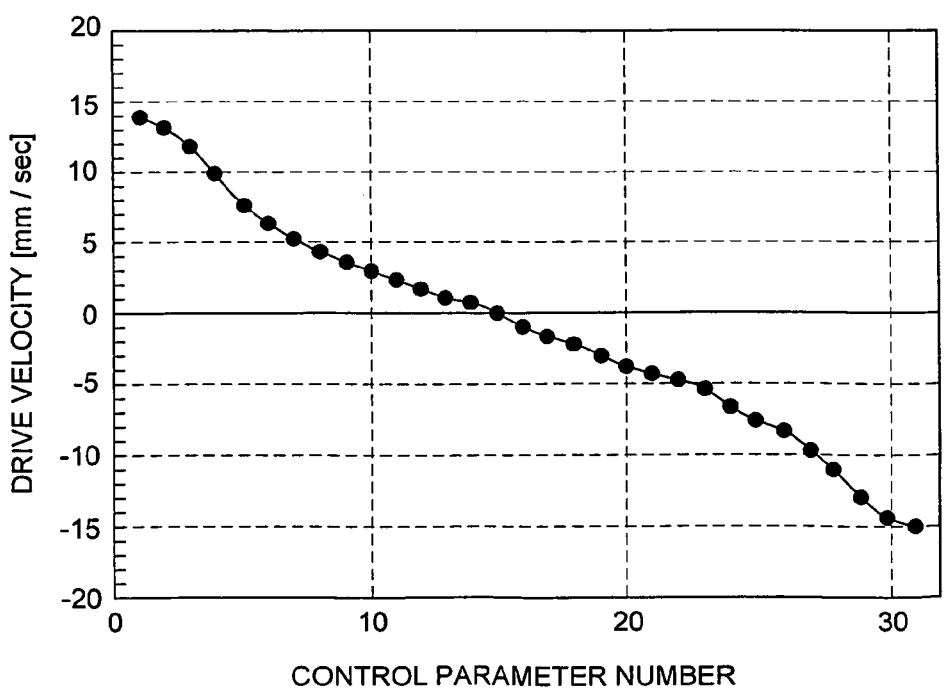
FIG. 12 shows the measured value for drive velocity in the case where hybrid control is performed.

The graph shown in FIG. 12 shows the hybrid control described above, or in other words, the space for the movement velocities which can be set in stages by velocity control using the time width adjustment at the drive waveform, being interpolated using the movement velocity which can be set by velocity control based on the thinning of the signal and the measured values for drive velocities in the case where control in which the movement velocity of the drive unit 13 is changed.

In FIG. 12, the horizontal axis shows the parameter number while the vertical axis shows the drive velocity of the drive unit 13. The control parameter numbers are control parameter numbers where the numbers 1-31 are assigned to the control parameter at each point where velocity control is performed along the arrows D1 to D14 shown in FIG. 11.

As shown in the graph of FIG. 12, when compared with drive velocity control using only time width adjustment for the drive waveform (See FIG. 6), in hybrid control, good control in which velocity separation is possible for a wide velocity range (particularly in the velocity range for low velocity regions), or in other words, fine velocity control of the drive unit 13 is possible and reduced power consumption due to thinning of the drive signals is also achieved.

Due to the operation of the driving device 1 described above, when the voltage applied to the piezoelectric element 11 goes repeatedly from the maximum value (+Vp)→the middle value 1 (0V)→the minimum value (—Vp)→the middle value 2 (0V), the timing of applying voltage of the maximum value and the minimum value may be offset by complementally reducing and increasing, the time (second period tc) for applying the voltage of the middle value 1 and the time (fourth period td) for applying the voltage of the middle value 12. In addition, because the drive velocity of the drive unit 13 is changed by complementally changing the time for applying the voltage of the maximum voltage value and the minimum voltage value, sufficiently low drive velocity and smooth changing of the drive velocities become possible.

Also due to the operation of the driving device described above, when the output cycle is repeated such that the voltages applied to the piezoelectric element 11 are the maximum value (+Vp), the minimum value (−Vp), the middle value (0V), because the velocity of the drive unit 13 can be changed by cyclically causing voltage applied for the maximum value and the minimum value to be voltage of the thinned middle value, suitable low velocity driving can be carried out and power consumption can be reduced.

In the embodiment of this invention in which an output cycle is repeated which selectively outputs 1 voltage value from a first voltage value, a second voltage value which is less than the first voltage value, and a third voltage value which is less than the second voltage value, and firstly, the first voltage value is output during a first period, and next the second voltage value is output during a second period, and then the third voltage value is output during a third period, and lastly the second voltage value is output during a fourth period, and in the aspect for applying voltage to an electromechanical conversion element, in the case where the second period is expanded, the third and the fourth period are shortened and the first period is expanded, and in the case where the second period is shortened, the third and the fourth period are expanded and the first period is shortened, sufficiently low drive velocity and smooth changing of the drive velocities become possible.

In the embodiment of this invention in which an output cycle is repeated which selectively outputs 1 voltage value from a first voltage value, a second voltage value which is less than the first voltage value, and a third voltage value which is less than the second voltage value and applies voltage to an electromechanical conversion element, and also changes the movement velocity of the moveable portion by cyclically thinning the output cycle for repetition of the output cycle, appropriate low velocity driving can be performed and power consumption can be reduced.

In particular, in the embodiment in which the output cycle is thinned cyclically based on the frequencies outside the audible frequency range, generation of disturbing drive sounds is suppressed.

In addition, in the embodiment in which the first period and the third period complementally increase and reduce, and the second period and the fourth period complementally increase and reduce, sufficiently low velocity driving is performed and smooth changing of the drive velocities become possible.

In addition, in the embodiment in which the interval between the movement velocity which can be set by velocity change section is interpolated using the movement velocity which can be set by velocity control section and the movement velocity of the movable portion can be controlled, sufficiently low velocity driving is performed and smoother changing of the drive velocities become possible.

In the embodiment in which a predetermined drive mechanism in a camera is driven by the driving device of an embodiment of this invention, a compact camera can be achieved.

In addition, in the embodiment which the prescribed driving mechanism is a hand vibration correction mechanism, the hand vibration correction mechanism can be compact.

It is to be noted that the drive mechanism 1 described above can be used in a hand vibration correction mechanism of a camera (image capturing device). The structure of this type of camera will be described in detail in the following.

Figure 13:
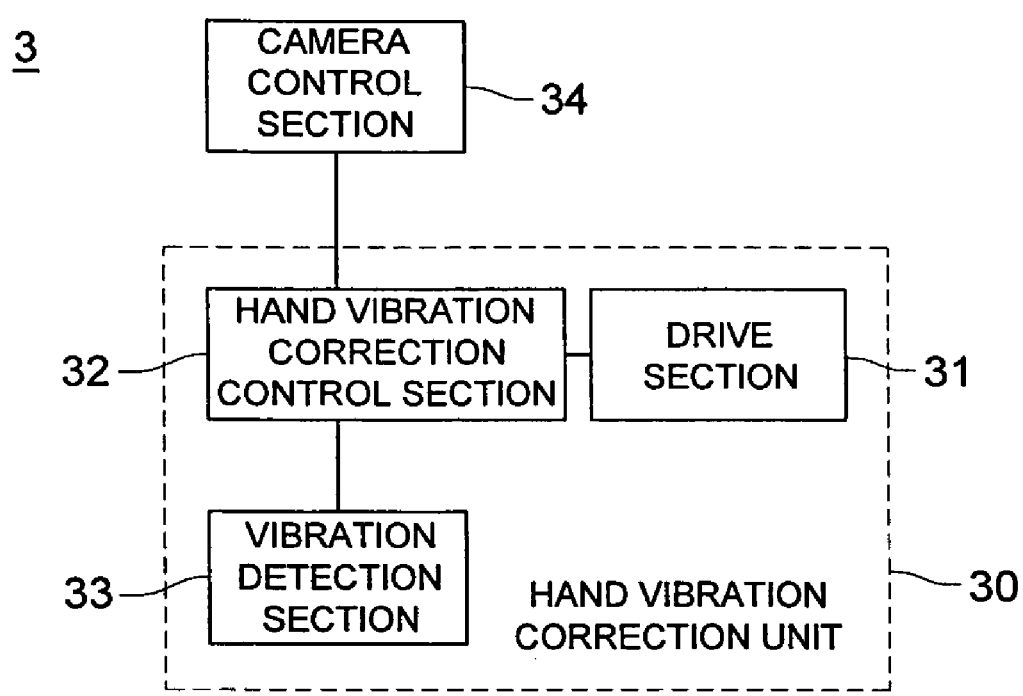
FIG. 13 is a block diagram showing the main components of camera 3 in which hand vibration correction is possible.
Figure 14:
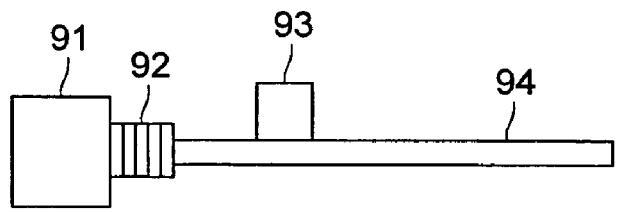
FIG. 14(a) to FIG. 14(c) are drawings for explaining the driving device of the prior art of this invention.
Figure 14:
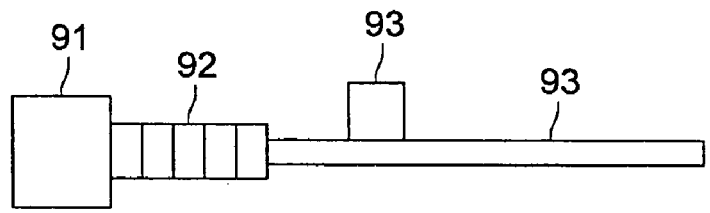
Figure 14:
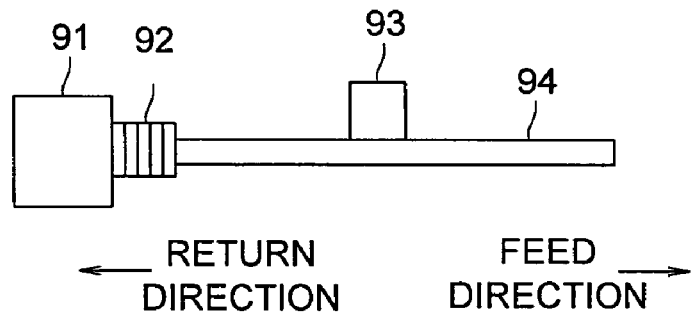
Figure 15:
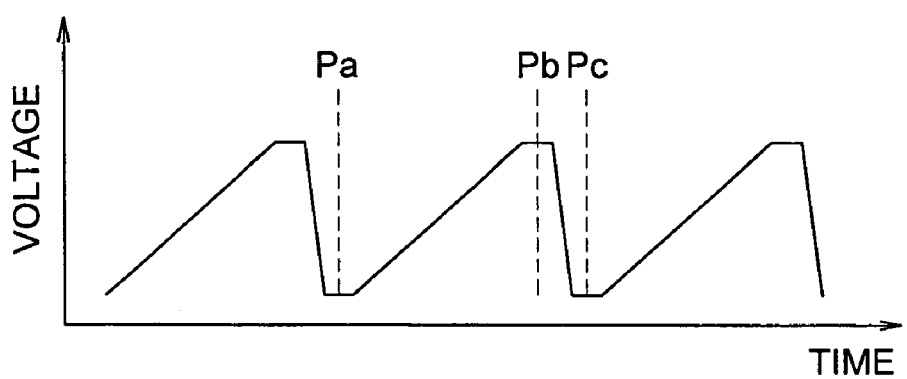
FIG. 15 is a drawing for explaining the driving device of the prior art of this invention.
Figure 16:
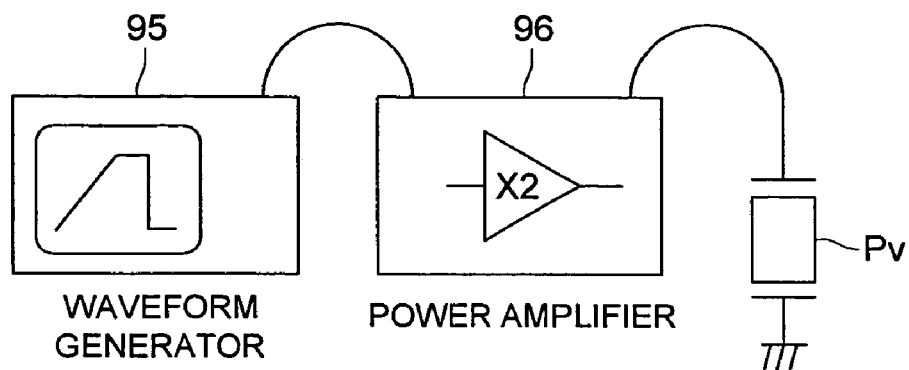
FIG. 16(a) to FIG. 16(c) are drawings for explaining the driving device of the prior art of this invention.
Figure 16:
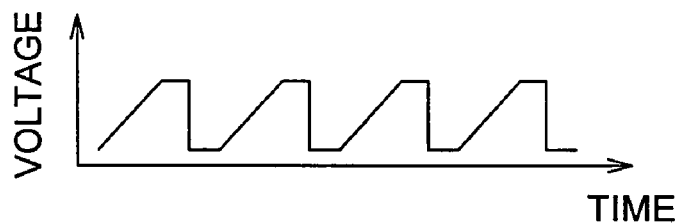
Figure 16:
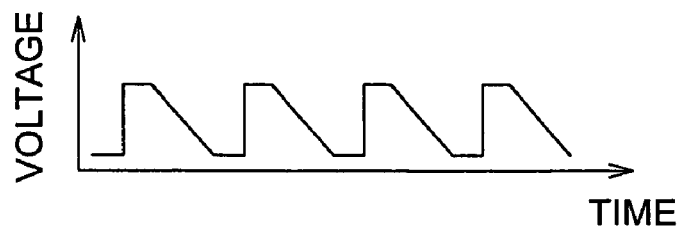
Figure 17:
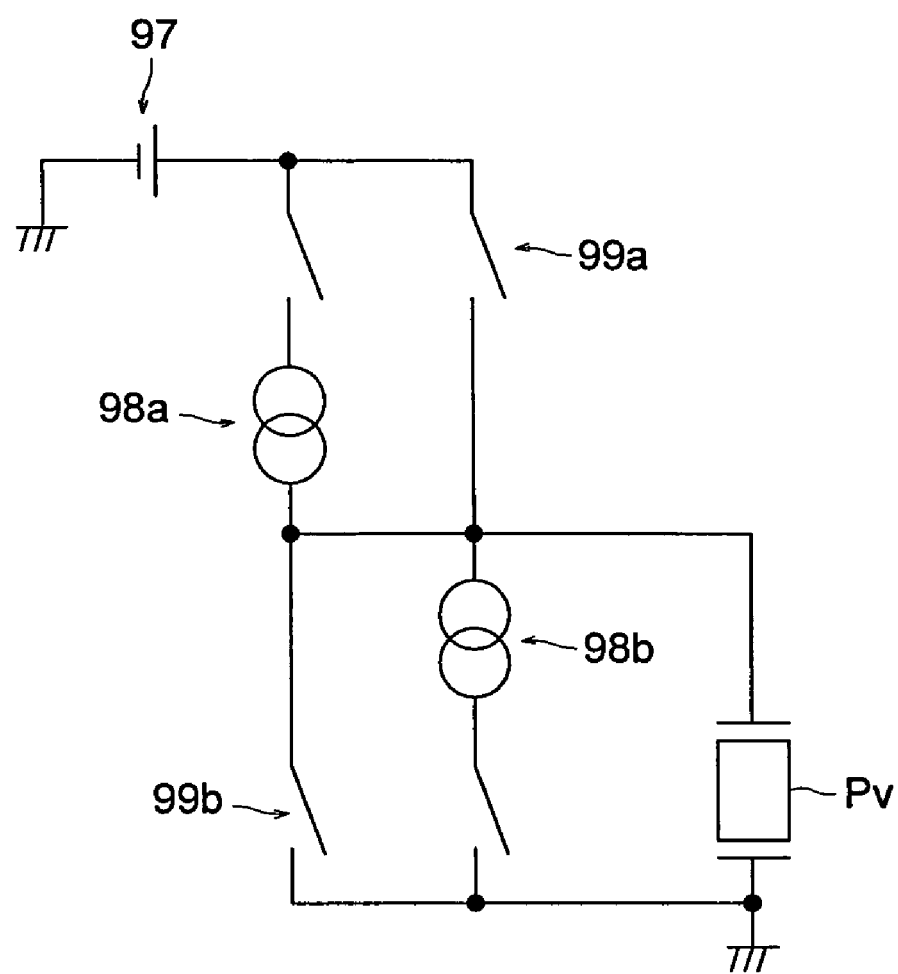
FIG. 17 is for explaining the driving device of the prior art of this invention.
Figure 18:
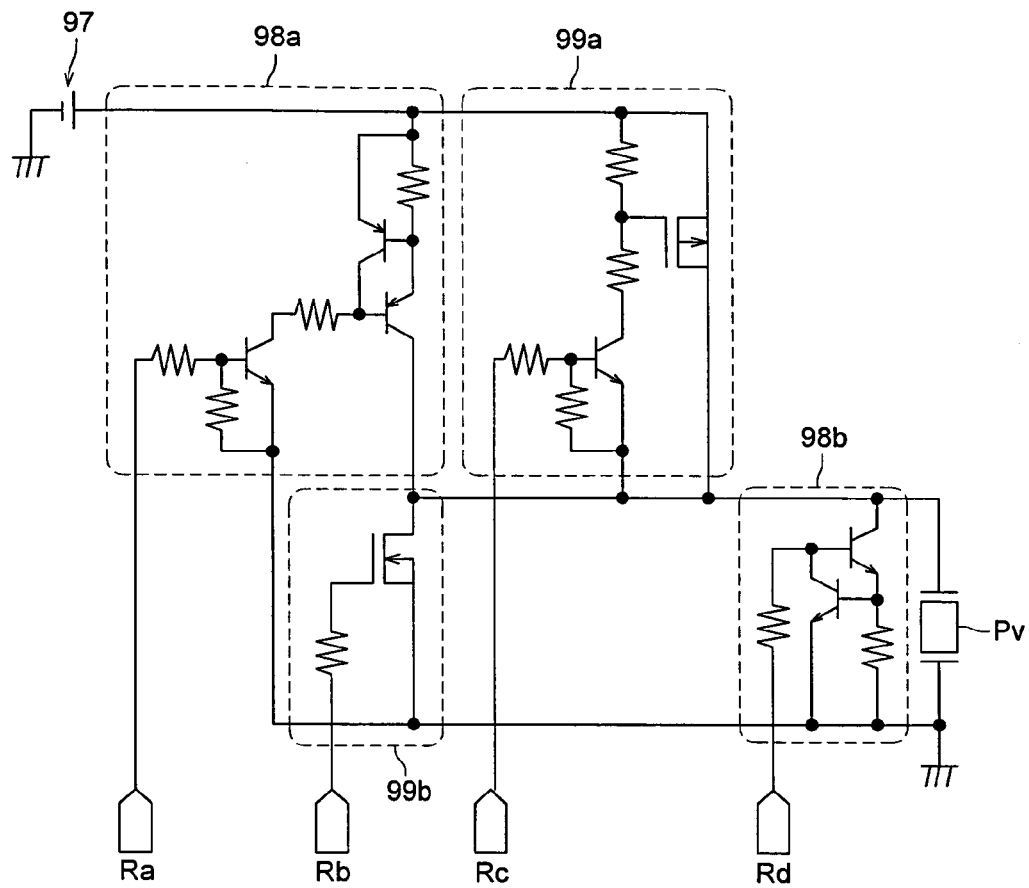
FIG. 18(a) and FIG. 18(b) are for explaining the driving device of the prior art of this invention.
Figure 18:
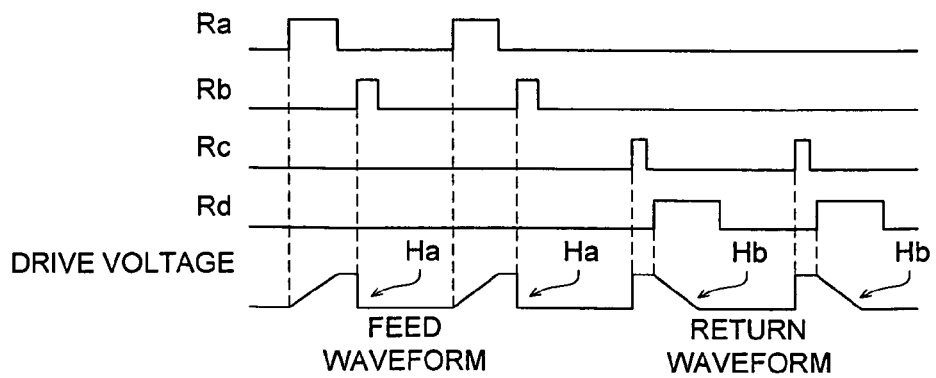

FIG. 13 is a block diagram of the main parts of the camera 3 in which hand vibration correction is possible.

The camera 3 may, for example, be a digital camera, and comprises a hand vibration correction unit 30 which functions as a hand vibration correction mechanism and a camera control section 34 which is connected to the hand vibration correction unit 30 such that transmission is possible. The camera control section 34 performs general control of the operation of the camera 3 except for hand vibration correction, and sends signals to the hand vibration correction unit 30 depending on the need for hand vibration correction and gives instructions for the start and end of hand vibration correction.

The hand vibration correction unit 30 comprises a drive unit 31 which corresponds to the driving device 1, a hand vibration correction section 32 and a vibration detection section 33.

The vibration detection section 33 has an angular velocity detection sensor, and it detects shaking of the camera 3 and outputs signals in accordance with changes in the photographing angle.

The hand vibration correction section 32 obtains the hand vibration correction amount based on signal output from the vibration detection section 33, and drive signals based on the hand vibration correction amount are output to the drive section 31. In addition, by performing drive control (velocity control) of the drive unit 13 based on the drive signals at the drive section 31, suitable hand vibration correction can be realized.

By using the driving device 1 including the piezoelectric described above in the hand vibration correction mechanism of the camera 3, a compact camera can be achieved. It is to be noted that the camera can be made more compact by using the driving device 1 not only in the hand vibration correction mechanism, but also in the other driving mechanisms such as the lens driving mechanism.

Modified Example

In the driving device 1 of the embodiment above uses not only a piezoelectric element but may use any electromechanical conversion element that converts electrical energy such as voltage, currents, electrical fields, magnetic fields, static electricity and the like to mechanical energy such as extension, bending, twisting and warping such as an elecrostrictive element, a magnetostrictive element, an electrostatic actuator and the like.

While the preferred embodiments of the present invention have been described using specific terms, such description is for illustrative purpose only, and it is to be understood that changes and variations may be made without departing from the spirit or scope of the appended claims.

What is claimed is:

1. A driving device, comprising:
   an electromechanical conversion element which expands and contracts in response to an application of voltage;
   a predetermined member which reciprocates with the movement of expanding and contracting of the electromechanical conversion element;
   a moving member which engages with the predetermined member with frictional force and moves relatively to the predetermined member by the movement of expanding and contracting of the electromechanical conversion element; and
   a voltage applying section which applies a voltage to the electromechanical conversion element repeating a first output cycle, with a fixed time cycle, constituted of an integral number of second output cycles each of which includes a first voltage having a first period and a second voltage, having a second period, lower than the first voltage, and a third voltage lower than the second voltage,
   wherein the voltage applying section comprises a velocity change section which changes a moving velocity of the moving member by replacing at least one of the second output cycles with a voltage signal of the second voltage having the same period as the second output cycle to be replaced.

2. The driving device of claim 1, wherein the velocity change section comprises a thinning control section which cyclically replaces the second output cycle, with a voltage signal of the second voltage, based on a frequency other than an audible frequency range.

3. The driving device of claim 1, wherein in the second output cycle, the voltage applying section first outputs the first voltage for the first period, outputs the second voltage for the following second period, outputs the third voltage for a following third period and outputs the second voltage for a last fourth period, and the voltage applying section includes a velocity control section which controls the velocity of the moving member with respect to the predetermined member by varying lengths of the first period through the fourth period, the velocity control section shortening the third period and the fourth period and expanding the first period when expanding the second period, and expanding the third period and the fourth period and shortening the first period when shortening the second period.

4. The driving device of claim 3, wherein the first period and the third period have a complementally increasing and decreasing relation to each other, and the second period and the fourth period have a complementally increasing and decreasing relation to each other.

5. The driving device of claim 3, wherein the voltage applying section interpolates a gap between velocities set by the velocity change section with a velocity set by the velocity control section to change the moving velocity of the moving member.

6. A driving system including the driving device of claim 1, wherein the driving device drives a predetermined drive mechanism in a camera.

7. The driving system of claim 6, wherein the predetermined driving mechanism includes a hand vibration correction mechanism for correcting a hand vibration.

8. A driving device, comprising:

an electromechanical conversion element which expands and contracts in response to an application of voltage;

a predetermined member which reciprocates with the movement of expanding and contracting of the electromechanical conversion element;

a moving member which engages with the predetermined member with frictional force and moves relatively to the predetermined member by the movement of expanding and contracting of the electromechanical conversion element; and a voltage applying section which applies a voltage to the electromechanical conversion element repeating an output cycle in which the voltage applying section first outputs a first voltage for a first period, outputs a second voltage lower than the first voltage for a following second period, outputs a third voltage lower than the second voltage for a following third period and outputs the second voltage for a following fourth period, wherein the voltage applying section includes a velocity control section which controls the velocity of the moving member with respect to the predetermined member by varying lengths of the first period through the fourth period, and the velocity control section shortens the third period and the fourth period and expands the first period when expanding the second period, and expands the third and the fourth period and shortens the first period when shortening the second period.

9. The driving device of claim 8, wherein the first period and the third period have a complementally increasing and decreasing relation to each other, and the second period and the fourth period have a complementally increasing and decreasing relation to each other.

10. A driving system including the driving device of claim 8, wherein the driving device drives a predetermined drive mechanism in a camera.

11. The driving system of claim 10, wherein the predetermined driving mechanism includes a hand vibration correction mechanism for correcting a hand vibration.

12. The driving device of claim 8, wherein the first voltage, the second voltage and the third voltage are applied to the electromechanical conversion element as a rectangular wave signal.

13. The driving device of claim 8, wherein a moving direction of the moving member is changed by changing a length of at least one of the first period and the second period.

14. A driving device, comprising:

an electromechanical conversion element which expands and contracts in response to an application of voltage;

a predetermined member which reciprocates with the movement of expanding and contracting of the electromechanical conversion element;

a moving member which engages with the predetermined member with frictional force and moves relatively to the predetermined member by the movement of expanding and contracting of the electromechanical conversion element; and a voltage applying section which applies a voltage to the electromechanical conversion element repeating a first output cycle constituted of an integral number of second output cycles in each of which the voltage applying section first outputs a first voltage for a first period, outputs a second voltage lower than the first voltage for a following second period, outputs a third voltage lower than the second voltage for a following third period and outputs the second voltage for a following fourth period, wherein the voltage applying section comprises a velocity change section which changes a moving velocity of the moving member by replacing at least one of the second output cycles with a voltage signal of the second voltage having the same period as the second output cycle to be replaced, and a velocity control section which controls the velocity of the moving member with respect to the predetermined member by varying lengths of the first period through the fourth period, the velocity control section shortening the third period and the fourth period and expanding the first period when expanding the second period, and expanding the third period and the fourth period and shortening the first period when shortening the second period.

15. The driving device of claim 14, wherein the velocity change section comprises a thinning control section which cyclically replaces the second output cycle, with a voltage signal of the second voltage, based on a frequency other than an audible frequency range.

16. The driving device of claim 14, wherein the first period and the third period have a complementally increasing and decreasing relation to each other, and the second period and the fourth period have a complementally increasing and decreasing relation to each other.

17. The driving device of claim 14, wherein the voltage applying section interpolates a gap between velocities set by the velocity change section with a velocity set by the velocity control section to change the moving velocity of the moving member.

18. A driving system including the driving device of claim 14, wherein the driving device drives a predetermined drive mechanism in a camera.

19. The driving system of claim 18, wherein the predetermined driving mechanism includes a hand vibration correction mechanism for correcting a hand vibration.

20. The driving device of claim 14, wherein the first voltage, the second voltage and the third voltage are applied to the electromechanical conversion element as a rectangular wave signal.

21. The driving device of claim 1, wherein the voltage applying section further outputs a third voltage lower than the second voltage, in the second output cycle, the voltage applying section first outputs the first voltage for the first period, outputs the second voltage for the following second period, outputs the third voltage for a following third period, and outputs the second voltage for a following fourth period, and wherein the voltage applying section comprises a velocity change section which changes a moving velocity of the moving member by replacing at least one of the second output cycles with the second voltage with the same period as the second output cycle to be replaced.

* * * * *

UNITED STATES PATENT AND TRADEMARK OFFICE
CERTIFICATE OF CORRECTION

PATENT NO. : 7,608,979 B2
APPLICATION NO. : 11/493227
DATED : October 27, 2009
INVENTOR(S) : Junji Sato et al.

Page 1 of 1

It is certified that error appears in the above-identified patent and that said Letters Patent is hereby corrected as shown below:

Column 1:
Line 4, delete "No. 2005-226156 filed on Aug. 4, 2005, and No. filed on Aug." and insert -- No. 2005-226156 filed on Aug. 4, 2005, and No. 2005-226157 filed on Aug. --.

Signed and Sealed this

First Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,608,979 B2  Page 1 of 1
APPLICATION NO. : 11/493227
DATED : October 27, 2009
INVENTOR(S) : Sato et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 540 days.

Signed and Sealed this

Fourteenth Day of December, 2010

David J. Kappos
*Director of the United States Patent and Trademark Office*